United States Patent [19]

Gandre

[11] Patent Number: 5,767,463
[45] Date of Patent: Jun. 16, 1998

[54] KEYBOARD WITH TILTED AXIS KEY DESIGN

[75] Inventor: Jerry D. Gandre, Austin, Tex.

[73] Assignee: Dell USA, L.P., Round Rock, Tex.

[21] Appl. No.: 727,102

[22] Filed: Oct. 8, 1996

[51] Int. Cl.$^6$ .............................. H01H 9/26; B41J 5/08
[52] U.S. Cl. .................. 200/5 A; 200/5 R; 400/490
[58] Field of Search ....................... 200/5 A, 5 R, 200/344; 400/490, 491.2, 495

[56] References Cited

U.S. PATENT DOCUMENTS

| | | | |
|---|---|---|---|
| 4,468,542 | 8/1984 | Pounds | 200/5 A |
| 4,493,959 | 1/1985 | Viebrantz | 200/340 |
| 4,509,873 | 4/1985 | Ryan | 400/489 |
| 4,597,681 | 7/1986 | Hodges | 400/488 |
| 4,997,998 | 3/1991 | Bauer et al. | 200/345 |
| 5,145,270 | 9/1992 | Darden | 400/488 |
| 5,168,427 | 12/1992 | Clancy et al. | 361/393 |
| 5,267,127 | 11/1993 | Pollitt | 361/680 |
| 5,351,066 | 9/1994 | Rucker et al. | 345/168 |
| 5,387,261 | 2/1995 | Yamada et al. | 400/490 |
| 5,426,449 | 6/1995 | Danziger | 345/168 |
| 5,473,346 | 12/1995 | Pollack | 345/169 |
| 5,583,497 | 12/1996 | Hankes | 341/22 |

OTHER PUBLICATIONS

Work Week, "A Special News Report About Life On the Job—and Trends Taking Shape There," The Wall Street Journal, Apr. 9, 1996.

"Ergonomic Test of the KINESIS Keyboard," Global Ergonomic Technologies, Inc., prepared by Wanda Smith, President, and Dan Cronin, Engineer, Dec. 16, 1992.

*Primary Examiner*—Michael L. Gellner
*Assistant Examiner*—Michael J. Hayes
*Attorney, Agent, or Firm*—M. Kathryn Braquet Tsirgotis

[57] ABSTRACT

The present invention provides a keyboard for typewriters, computers, and similar machines with improved ergonomics of control and a lower overall profile for the keyboard without a reduction in the range of key travel. The keyboard of the present invention includes a support base with a plurality of key shafts protruding outwardly from the support base. The key shafts are angled relative to the support base, for instance at a substantially 45 degree angle, and slanted away from a user of the keyboard. A keycap with a key guide slidably disposed about each key shaft is included wherein each keycap has an angled travel axis longitudinally along the key shaft. A plurality of switching elements is coupled to the support base with a switching element disposed beneath each key shaft. The keycap is moveable down and toward the user along the angled travel axis to operate the switching element. The activation surface of the keycap is slanted down and away from a user; for instance, the activation surface is substantially perpendicular to the travel axis wherein improved ergonomics of control is provided as well as a smaller keyboard without a reduction in the key travel range.

22 Claims, 4 Drawing Sheets

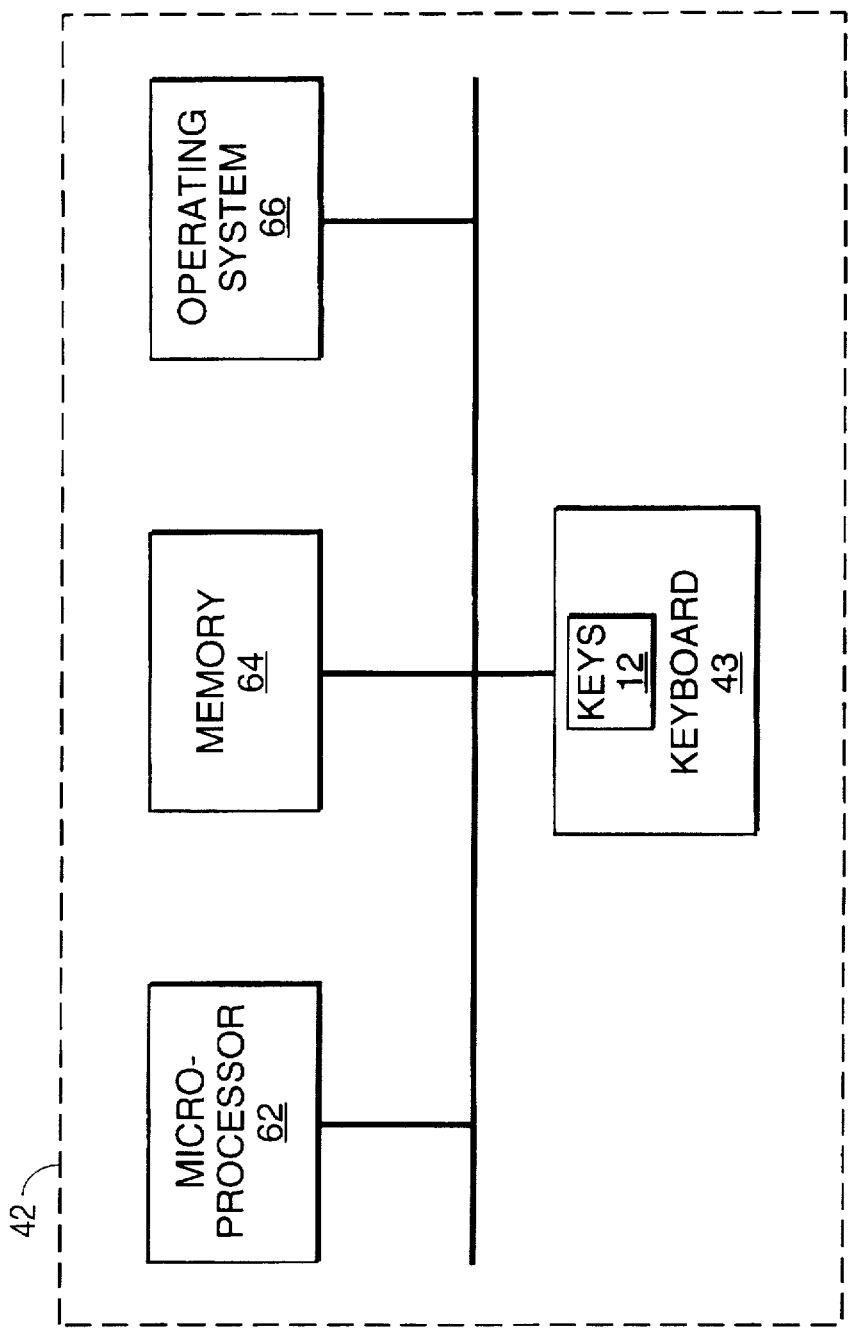

KEYBOARD WITH TILTED AXIS KEY DESIGN

BACKGROUND OF THE INVENTION

1. Field of the Invention

The present invention relates to keys and keyboards for typewriters, computers, and similar machines, and more particularly concerns such keyboards of improved ergonomics and reduced size.

2. Description of the Related Art

A conventional keyboard of a typewriter, calculator, computer or similar machine has a set of keys substantially aligned in a single plane that is somewhat tilted toward the operator. The operator's forearms are positioned at inwardly directed angles from the operator's sides toward the keyboard, with the palms down, the wrists bent, and the hands generally flat or at a slight upward tilt. The fingers must then be moved up and down by pivoting each finger at the last joint near the hand or by moving the hand up and down and using the fingertips to activate the keyboard keys. In an unstressed position, the wrists are naturally unbent and the fingers naturally in a curled position. Therefore, there is a need to design a keyboard which allows a user to use a more natural and restful position for maximized comfort and convenience.

In the field of computers, portable personal computers have attained widespread use in many segments of today's modern society. These portable personal computer systems, often referred to as laptop, notebook or subnotebook computers, are designed primarily to give mobile independent computing power to a single user and are inexpensively priced for purchase by individuals or small businesses. These computers typically incorporate a small size and a shallow physical depth; therefore, as is well known, a critical design criteria for portable computers is ultra-small size. Accordingly, there is also a need to design a comfortable and convenient keyboard with a reduced size for use in portable personal computers.

SUMMARY OF THE INVENTION

The present invention provides a keyboard for typewriters, computers and similar machines with improved ergonomics of control and a lower overall profile for the keyboard without a reduction in the range of key travel. The keyboard of the present invention includes a support base with a plurality of key shafts protruding outwardly from the support base. The key shafts are angled relative to the support base, for instance at a substantially 45 degree angle, and slanted away from a user of the keyboard. A keycap with a key guide slidably disposed about each key shaft is included wherein each keycap has an angled travel axis longitudinally along the key shaft. A plurality of switching elements is coupled to the support base with a switching element disposed beneath each key shaft. The keycap is moveable down and toward the user along the angled travel axis to operate the switching element. The activation surface of the keycap is slanted down and away from a user; for instance, the activation surface is substantially perpendicular to the travel axis wherein improved ergonomics of control is provided as well as a smaller keyboard without a reduction in the key travel range.

BRIEF DESCRIPTION OF THE DRAWINGS

The present invention may be better understood, and its numerous objects, features and advantages made apparent to those skilled in the art, by referencing the accompanying drawings.

FIG. 6 is a block diagram of a portable computer system incorporating therein the keyboard of the present invention. The use of the same reference symbols in different drawings indicates similar or identical items.

DESCRIPTION OF THE PREFERRED EMBODIMENT(S)

Figure 1:
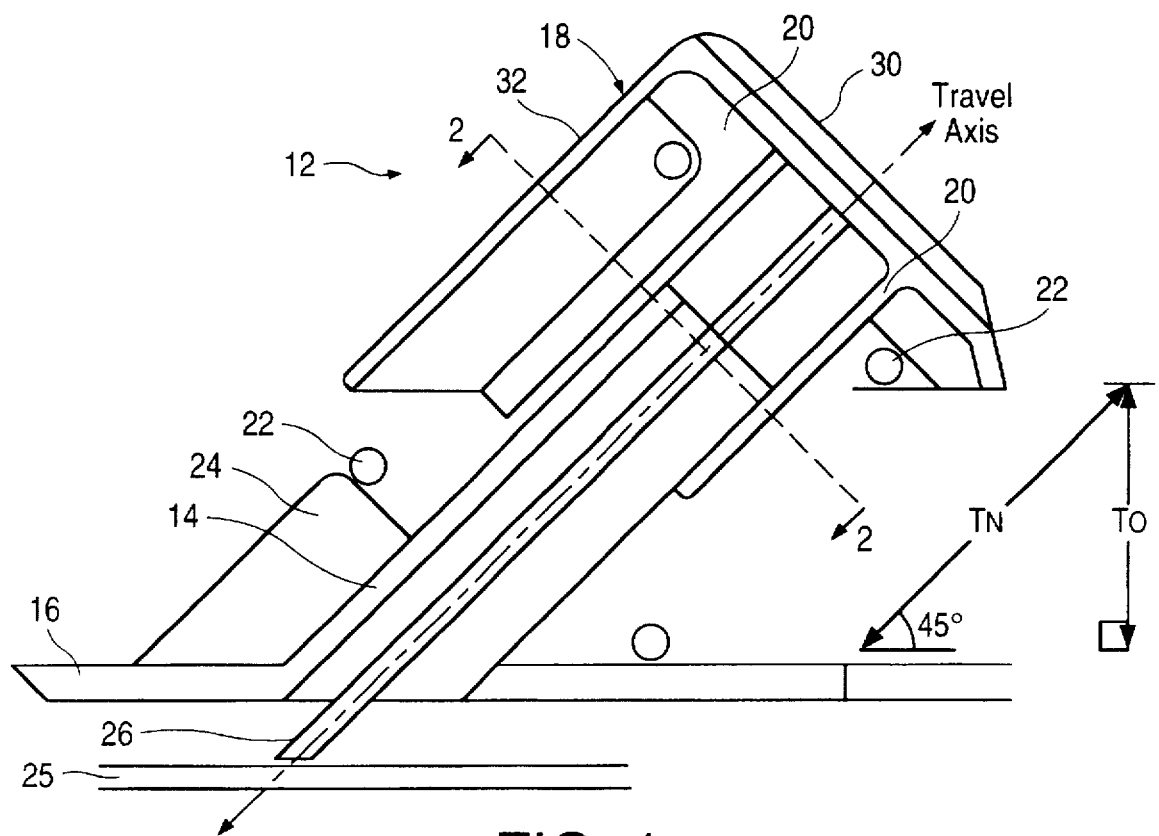
FIG. 1 is a sectional view of a portion of a keyboard of the present invention illustrating the configuration of a key in relation to a supporting base of the keyboard.

In the description which follows, like parts are marked throughout the specification and drawings with the same reference numerals, respectively. The drawing figures are not necessarily to scale, and certain features of the invention may be shown exaggerated in scale in the interest of clarity and conciseness.

Referring now to FIG. 1, a sectional view of a portion of a keyboard of the present invention illustrating the configuration of a key in relation to a supporting base of the keyboard is shown. The keyboard has a plurality of keys arranged on the support base. The keys are similar except that they may include keycaps of different sizes and with different legends.

Figure 2:
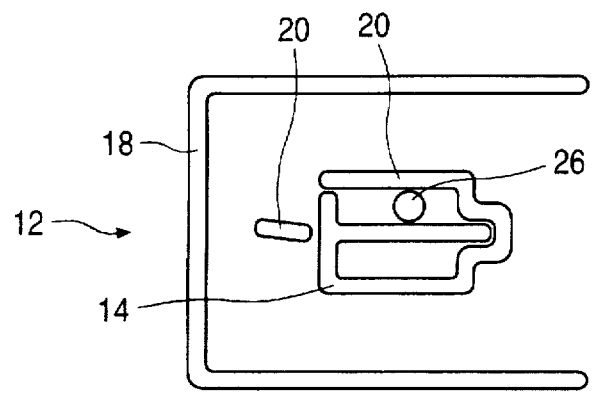
FIG. 2 is a section view taken along line 2—2 of FIG. 1.

Key 12 comprises a key shaft 14 protruding outwardly from the support base 16 wherein the key shaft 14 is angled relative to the support base 16 and slanted away from a user of the keyboard. The key 12 also includes a keycap 18, the keycap 18 having a key guide 20 slidably disposed about the key shaft 14 and having an angled travel axis longitudinally along the key shaft 14. As illustrated in FIG. 2, for instance, the key shaft 14 is substantially "T" shaped and the key guide 20 includes a substantially "U" shaped member and a rib member. The keycap 18 has an activation surface 30 which is substantially perpendicular to the travel axis and is angled down and away from a user. The activation surface 30 is the surface that is activated by the user's finger as will be further illustrated below. The keycap 18 includes a second surface 32 visible to the user and having a symbol to identify the key 12.

Referring back to FIG. 1, the keycap 18 is moveable down and toward the user along the travel axis with a keystroke to operate or actuate a switching element 25. The switching element 25 is disposed beneath the key shaft 14. The switching element 25 is a conventional switching element, such as a mechanical, rubber dome or membrane contact type switch, a capacitive switch, a Hall-effect switch, or the like, which is known to those skilled in the art. A plurality of switching elements 25 are coupled to the support base 16 with conventional fasteners, such as snaps or screws (not shown). An actuator or switch plunger 26 is disposed between each key shaft 14 and key guide 20 and longitudinally moveable along the axis of the key shaft 14 for actuating the switching element 25. The actuator 26 is fixed to the keycap 18 for actuation of the switching element 25 with a keystroke.

A resilient member, such as a spring 22, composed of metal or elastomer, is disposed between the key shaft 14 and the keycap 18. The spring 22 returns the keycap 18 to the top of the travel axis at the end of a keystroke. The lower end of the spring 22 is fitted against a spring seat 24 which holds the lower end of the spring 22 against lateral movement during a keystroke. The spring seat 24 may be an integral part of the support base 16 or may be coupled to support base 16. An elastomeric dome (not shown) disposed beneath the key shaft 14 and actuator 26 may also be used as a resilient member to return the keycap 18 to the top of the travel axis at the end of a keystroke.

The key shaft 14 and the travel axis for the keycap 18 is angled from the support base, for instance, at a substantially 45 degree angle, although the key shafts may have varying angles relative to each other. For instance, the angle of the key shaft 14, and therefore the travel axis of the keycap 18, may vary from one row to another row of keys 12 on the keyboard for optimum use. The angled travel axis of the key 12 and the resultant movement of the keycap 18 down and toward the user along the travel axis for activation provides improved ergonomics of control and a smaller overall profile of the keyboard while still providing an effective travel range of the key similar to conventional keyboards. The advantages are especially useful in portable computers and similar applications where size reduction and ease of use are important design considerations.

In regards to size reduction of the keyboard profile and travel range of the keycap 18, for instance, as illustrated in FIG. 1, a conventional keyboard key would have a travel range of $T_o$ in contrast to a travel range of $T_n$ for the key 12 of the present invention wherein $T_n$ is greater than $T_o$. If, for instance, the key shaft 14 is angled substantially 45°, then, using basic trigonometry:

$$T_n = \sqrt{(T_o^2 + T_o^2)},$$

therefore, in this example, $$T_n = 1.414 T_o.$$

Therefore, the key 12 travel range may be increased and the overall profile of a conventional keyboard retained or the overall profile of the keyboard may be decreased and the conventional key travel range retained.

Figure 3C:
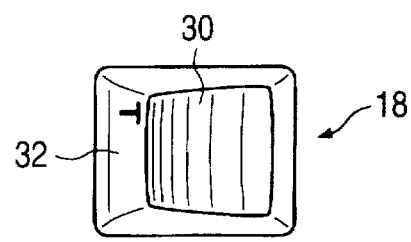
FIGS. 3A–3D are schematic views illustrating the keycap.
Figure 3A:
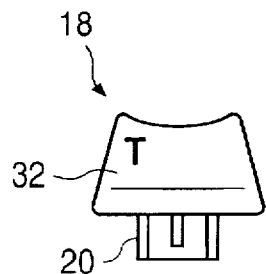
Figure 3B:
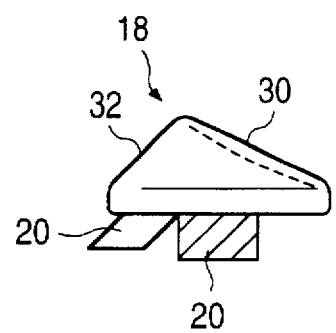
Figure 3D:
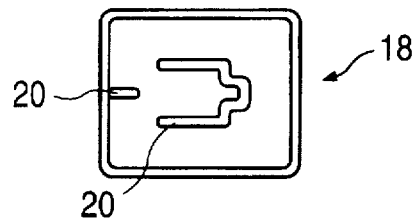

FIGS. 3A–3D are schematic views illustrating the keycap, wherein FIG. 3A illustrates a front view of the keycap 18 including the second surface 32 having the symbol "T", for example, and the key guide 20. FIG. 3B illustrates a side view of the keycap 18 including the activation surface 30, the second surface 32 and the key guide 20. FIG. 3C illustrates a top view of the keycap 18 including the activation surface 30 and the second surface 32. FIG. 3D illustrates a bottom view of the keycap 18 and the key guide 20. As seen in FIG. 3B, the activation surface 30 of the keycap 18 is substantially perpendicular to the travel axis of the keycap 18. The design of the activation surface 30 substantially perpendicular to the travel axis wherein the keycap 18 is moveable down and toward the user provides a more natural positioning of the hands and fingers during keystrokes and reduced binding of the keys, which maximizes comfort for the user and provides improved ergonomic activation of the key 18.

Figure 4:
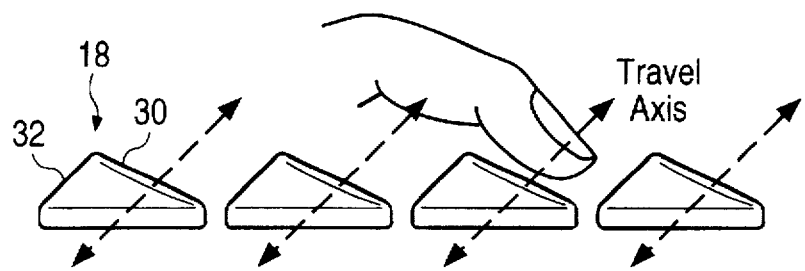
FIG. 4 is a partial side view of the keyboard of the present invention illustrating finger position for activation of the keys.

For instance, as illustrated in FIG. 4, when the user activates the key 18 on the keyboard of the present invention, the user's fingers are flexed in a curling fashion and the wrists are unbent in a more natural position providing for improved ergonomic activation of the key 18 in contrast to the user bending her wrists and moving her fingers up and down as on a conventional keyboard. Also, the activation surface 30 of the key 12 engages the soft underpart of the user's finger which provides a more comfortable keystroke than using the fingertip as on a conventional keyboard.

Figure 5:
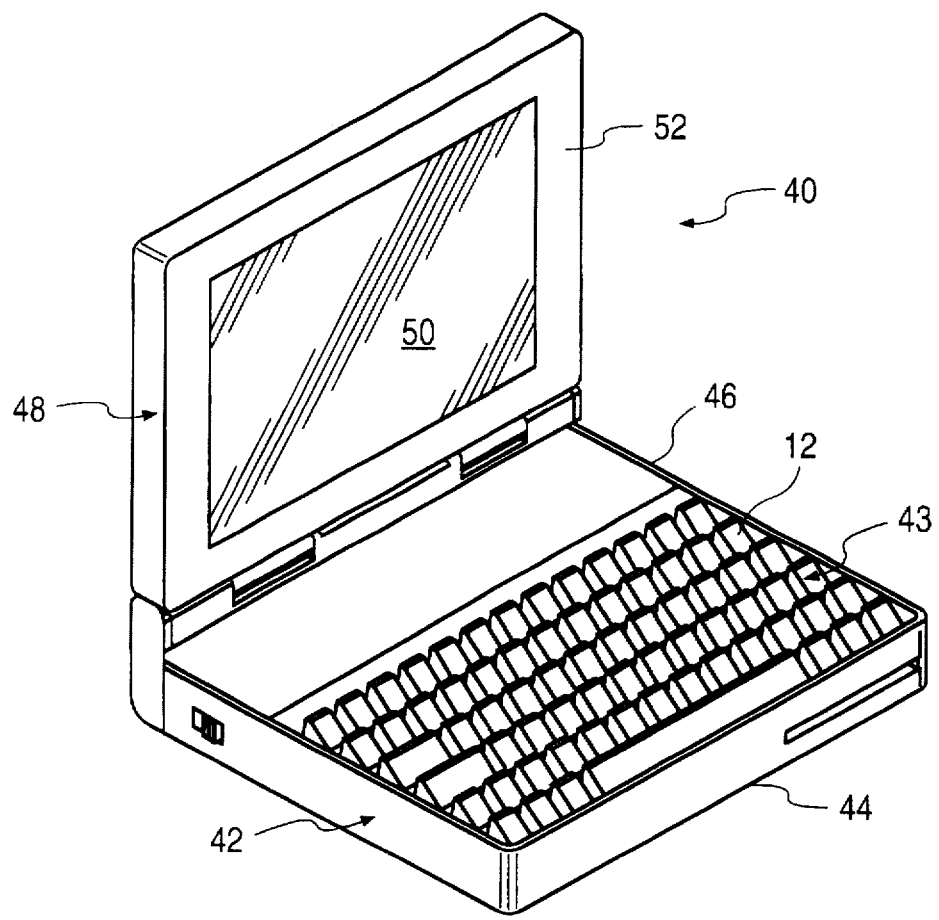
FIG. 5 is perspective view of a representative notebook personal computer incorporating therein the keyboard of the present invention, the computer being shown in an open position.

FIG. 5 illustrates the preferred embodiment wherein the keyboard of the present invention is incorporated into a compact portable computer such as the representatively illustrated laptop or notebook computer 40. The computer 40 includes an open-topped relatively thin rectangular base housing 42. The base housing 42 has a bottom side 44 adapted to rest upon a support surface (not shown) such as a table or a user's lap. A top side 46 of the base housing 42 is open and the keys 12 and keyboard structure 43 are supported within the base housing 42.

A thin rectangular lid housing 48 is secured for pivotal movement, notebook-like, between a closed storage and transport orientation in which the lid housing 48 extends across and covers the top side 46 of the base housing 42, and an open use position in which the lid housing 48 projects away from the base housing 42 leaving the top side 46 of the base housing 42 open and the keys 12 accessible to the user. The lid housing 48 carries a display monitor having a screen 50 extending across a front side 52 of the lid housing 48 and visible to the user in its upwardly pivoted use position. The system included in computer 40 includes a microprocessor 62, a memory 64 coupled to the microprocessor 62 and an operating system 66 supported, for instance, within the base housing 42 wherein the keys 12 and keyboard structure 43 are used to input data to the computer system 40.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A keyboard for data input comprising:
    a support base having a plurality of key shafts protruding outwardly from the support base wherein said key shafts are angled relative to the support base and slanted away from a user of the keyboard providing an angled travel axis longitudinally along said key shaft;
    a plurality of keycaps, each keycap having a key guide slidably disposed about each key shaft wherein each keycap is moveable along said angled travel axis and wherein each said keycap has an activation surface substantially perpendicular to said travel axis; and
    a plurality of switching elements coupled to the support base wherein a switching element is disposed beneath each key shaft and wherein each keycap is moveable down and toward the user along said angled travel axis to operate the switching element.

2. The keyboard according to claim 1, further comprising:
    a resilient mechanism mounted between each key shaft and keycap for returning the keycap to the top of the travel axis at the end of a keystroke.

3. The keyboard according to claim 1, further comprising:
    an actuator disposed between each key shaft and key guide and longitudinally moveable along the key shaft for actuating the switching element.

4. The keyboard according to claim 1 wherein each said key shaft is angled 45 degrees from said support base.

5. The keyboard according to claim 1 wherein each said key shaft has different angles relative to said support base.

6. The keyboard according to claim 1 wherein each said keycap has a second surface visible to the user, said second surface having a symbol identifying the keycap.

7. The keyboard according to claim 2 wherein said resilient mechanism is a metal spring.

8. The keyboard according to claim 2 wherein said resilient mechanism is an elastomer spring.

9. The keyboard according to claim 1 wherein said switching element is a contact switch.

10. The keyboard according to claim 1 wherein said switching element is a capacitive switch.

11. The keyboard according to claim 1 wherein said switching element is a Hall-effect switch.

12. A multiple key for a keyboard, the keyboard having a support base and a plurality of switching elements coupled to said support base, wherein each said switching element is disposed beneath each said key, said multiple key comprising:

- a plurality of key shafts protruding outwardly from the support base wherein said key shafts are angled relative to the support base and slanted away from a user of the keyboard providing an angled travel axis longitudinally along said key shaft; and
- a plurality of keycaps, each keycap having a key guide slidably disposed about each key shaft wherein each keycap is moveable down and toward the user along said angled travel axis to operate the switching element and wherein each said keycap has an activation surface substantially perpendicular to said travel axis and a second surface visible to the user, said second surface having a symbol identifying the keycap.

13. The multiple key according to claim 12 wherein each said key shaft is angled 45 degrees from said support base.

14. The keyboard according to claim 12 wherein each said key shaft has different angles relative to said support base.

15. The multiple key according to claim 12, further comprising:

- a resilient mechanism mounted between each key shaft and keycap for returning the keycap to the top of the travel axis at the end of a keystroke.

16. The multiple key according to claim 12, further comprising:

- an actuator disposed between each key shaft and key guide and longitudinally moveable along the key shaft for actuating the switching element.

17. The multiple key according to claim 15 wherein said resilient mechanism is a metal spring.

18. The multiple key according to claim 15 wherein said resilient mechanism is an elastomer spring.

19. The multiple key according to claim 12 wherein said switching element is a contact switch.

20. The multiple key according to claim 12 wherein said switching element is a capacitive switch.

21. The multiple key according to claim 12 wherein said switching element is a Hall-effect switch.

22. A portable computer system including a microprocessor, a memory coupled to the microprocessor, and an operating system stored in the memory, wherein the computer system further comprises:

- a keyboard for data input to the portable computer system, the keyboard having a support base and a plurality of key shafts protruding outwardly from the support base wherein said key shafts are angled relative to the support base and slanted away from a user of the keyboard providing an angled travel axis longitudinally along said key shaft;
- a plurality of keycaps, each keycap having a key guide slidably disposed about each key shaft wherein each keycap is moveable along said angled travel axis and wherein each said keycap has an activation surface substantially perpendicular to said travel axis; and
- a plurality of switching elements coupled to the support base wherein a switching element is disposed beneath each key shaft and wherein each keycap is moveable down and toward the user along said angled travel axis to operate the switching element.

\* \* \* \* \*